(12) United States Patent
Ito

(10) Patent No.: US 10,620,470 B2
(45) Date of Patent: Apr. 14, 2020

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/383,982

(22) Filed: Apr. 15, 2019

(65) Prior Publication Data

US 2019/0317361 A1 Oct. 17, 2019

(30) Foreign Application Priority Data

Apr. 16, 2018 (JP) ................................. 2018-078171

(51) Int. Cl.
*G02F 1/1362* (2006.01)
*G02F 1/1333* (2006.01)
(Continued)

(52) U.S. Cl.
CPC ...... *G02F 1/133512* (2013.01); *G02F 1/1343* (2013.01); *G02F 1/133345* (2013.01); *G02F 1/136209* (2013.01); *G02F 1/225* (2013.01)

(58) Field of Classification Search
CPC ............. H01L 27/3262; H01L 27/3276; H01L 29/78696; H01L 29/78609; H01L 29/78633; H01L 21/02107; G02F 1/1333; G02F 1/1343; G02F 1/1362; G02F 1/1368; G02F 1/134336; G02F 1/136209; G02F 1/136227; G02F 1/136286; G02F 1/133345; G02F 1/134309; G02F 1/133512; G02F 1/225; G02F 2203/01
See application file for complete search history.

(56) References Cited

U.S. PATENT DOCUMENTS

2002/0057403 A1* 5/2002 Yasukawa ......... G02F 1/136209
349/110
2004/0008295 A1* 1/2004 Ueda ................. G02F 1/136209
349/44
(Continued)

FOREIGN PATENT DOCUMENTS

JP 2002-091339 A 3/2002
JP 3991569 B2 10/2007
(Continued)

*Primary Examiner* — Thoi V Duong
(74) *Attorney, Agent, or Firm* — Oliff PLC

(57) ABSTRACT

In an electro-optical device, one surface side of a first substrate is provided with a wall portion covering a light-shielding body with an edge overlapping a pixel electrode in a plan view and a transmissive body located in a region surrounded by the wall portion. A cavity is provided between a side surface of the wall portion and the transmissive body. The cavity has a refractive index of 1, and thus, there is a significant difference in refractive index at a boundary surface between the transmissive body and the cavity. Therefore, even in a case where light travels to advance obliquely toward the wall portion, the boundary surface between the transmissive body and the cavity reflects the light toward the transmissive body with high reflection efficiency, and contributes to display. The cavity is a vacuum.

10 Claims, 9 Drawing Sheets

(51) Int. Cl.
*G02F 1/1343* (2006.01)
*G02F 1/1335* (2006.01)
*G02F 1/225* (2006.01)

(56) References Cited

U.S. PATENT DOCUMENTS

2012/0242915 A1  9/2012  Ozawa
2012/0249911 A1  10/2012 Kamino et al.
2018/0314086 A1  11/2018 Tateno et al.

FOREIGN PATENT DOCUMENTS

| JP | 2012-203203 A | 10/2012 |
| JP | 2012-208449 A | 10/2012 |
| JP | 2013-73181 A  | 4/2013  |
| JP | 2016-080956 A | 5/2016  |
| JP | 2018-185418 A | 11/2018 |

* cited by examiner

ELECTRO-OPTICAL DEVICE AND ELECTRONIC APPARATUS

The present application is based on, and claims priority from JP Application Serial Number 2018-078171, filed Apr. 16, 2018, the disclosure of which is hereby incorporated by reference herein in its entirety.

BACKGROUND

1. Technical Field

The present disclosure relates to an electro-optical device and an electronic apparatus including a pixel electrode formed on one surface side of a first substrate.

2. Related Art

In an electro-optical device (liquid crystal device) to be used as, for example, a light valve of a projection-type display device, an electro-optical layer (liquid crystal layer) is arranged between a first substrate and a second substrate. The first substrate is transmissive and is provided with light-shielding bodies such as a wiring, switching elements, transmissive pixel electrodes, and the like. The second substrate is transmissive and is provided with a common electrode. In such an electro-optical device, light entered from one of the first substrate and the second substrate is modulated from the time of entry to the time of exit from the other substrate, to display an image. Thus, in the first substrate, the light-shielding bodies are arranged to extend along outer edges of the pixel electrodes, and regions surrounded by the light-shielding bodies correspond to opening regions where the light can pass through.

Meanwhile, for the electro-optical device, a technology to prevent the light from being deviated from the opening regions is demanded for the purpose of, for example, improvement of light utilization efficiency. For example, in the technology that is disclosed in Japanese Patent No. 3,991,569, the following aspect is conceivable. That is, a first insulating film (inter-layer insulating film) formed on the first substrate includes regions corresponding to opening regions and formed as recessed portions. A second insulating film with a high refractive index is formed along inner walls of the recessed portions. According to such an aspect, the inner walls of the recessed portions form a boundary surface between the first insulating film and the second insulating film, and thus function as reflection surfaces. Therefore, a waveguide is configured in the opening regions. Thus, for example, even in a case where light entering from the second substrate side travels to advance obliquely toward outside of the opening regions (the side on which the light-shielding bodies are positioned), the light is reflected by the boundary surface toward the opening regions. Thus, the light utilization efficiency can be improved.

However, a configuration described in Japanese Patent No. 3,991,569 uses the boundary surface as a reflection surface by utilizing a difference in refractive index between the first insulating film and the second insulating film, and thus disadvantageously has low reflection efficiency. For example, the first insulating film formed of a silicon oxide film results in a refractive index of 1.46 and the second insulating film formed of a silicon oxynitride film results in a refractive index of 1.64, with respect to visible light with a wavelength of 550 nm. A difference in refractive index between the first insulating film and the second insulating film is only 0.18, which corresponds to low reflection efficiency.

SUMMARY

In view of the above-mentioned problems, an object of the disclosure is to provide an electro-optical device capable of increasing a difference in refractive index at a boundary surface, which contributes to improving light utilization efficiency, thus increasing reflection efficiency at the boundary surface, and also provide an electronic apparatus and a manufacturing method for the electro-optical device.

In order to achieve the above-mentioned object, an aspect of an electro-optical device according to the disclosure includes a first substrate, a pixel electrode, a light-shielding body including an edge overlapping the pixel electrode in a plan view, a wall portion having an insulation property and configured to cover the light-shielding body between the first substrate and the pixel electrode and to overlap an edge of the pixel electrode in the plan view, and a transmissive body provided in a region surrounded by the wall portion, wherein a cavity is formed between the wall portion and the transmissive body.

In the disclosure, the cavity is formed between the wall portion covering the light-shielding body with the edge overlapping the pixel electrode in a plan view and the transmissive body provided inside the recessed portion surrounded by the wall portion. There is a significant difference in refractive index at the boundary surface between the transmissive body and the cavity. Therefore, even in a case where light travels to advance obliquely toward the wall portion, the boundary surface between the transmissive body and the cavity reflects the light toward the transmissive body with high reflection efficiency, and contributes to display. Thus, the light utilization efficiency can be improved.

In the disclosure, an aspect can be adopted in which the cavity is formed to cover the wall portion. According to such an aspect, light traveling to advance obliquely toward the wall portion is reflected by the boundary surface between the transmissive body and the cavity to travel over a wide range toward the transmissive body. Thus, the light utilization efficiency can be improved.

In the disclosure, an aspect can be adopted in which the cavity includes a vacuum. According to such an aspect, a semiconductor process in a vacuum can be utilized to block the cavity. Thus, compared to a case where an inner portion of the cavity is to be an air layer, the cavity can be formed easily. In the disclosure, the "vacuum" means a space state having a pressure lower than an atmospheric pressure.

In the disclosure, an aspect can be adopted in which the cavity is configured to overlap a part of a surface on the pixel electrode side of the wall portion, and a contact hole, electrically coupling a wiring or an electrode positioned closer to the first substrate than the surface on the pixel electrode side to a wiring or an electrode positioned closer to the pixel electrode than the surface on the pixel electrode side, is provided in a portion which overlaps, in the plan view, a part of the surface on the pixel electrode side of the wall portion where the cavity is not formed.

In the disclosure, an aspect can be adopted in which the transmissive body has a refractive index equal to a refractive index of the wall portion.

In the disclosure, an aspect may be adopted in which the transmissive body has a higher refractive index than the wall portion. According to such an aspect, the difference in refractive index at the boundary surface between the transmissive body and the cavity can be increased, thus allowing improvement of reflection efficiency at the boundary surface.

In the disclosure, an aspect can be adopted in which the wall portion includes a plurality of inter-layer insulating films provided between the first substrate and the pixel electrode, and the light-shielding body includes a wiring or electrode provided between each of the plurality of inter-layer insulating films.

In the disclosure, an aspect can be adopted in which a stopper layer configured to face a side surface of the wall portion between the first substrate and the light-shielding body is provided inside the wall portion, and the cavity is formed to extend to a position identical to a position of the stopper layer in a thickness direction perpendicular to the first substrate. According to such an aspect, when the wall portion is formed by etching, an etching end point can be managed based on a positional relationship between the stopper layer and the wall portion. Accordingly, the width of the wall portion becomes excessively narrow, and the light-shielding body to project from the side surface of the wall portion can be suppressed.

Another aspect of the electro-optical device according to the disclosure includes a first substrate, a pixel electrode provided on one surface side of the first substrate, a light-shielding body configured to extend between the first substrate and the pixel electrode and to include an edge overlapping the pixel electrode in the plan view, a wall portion having an insulation property and configured to cover the light-shielding body between the first substrate and the pixel electrode and to extend along an edge of the pixel electrode in the plan view, and a transmissive body provided inside a recessed portion surrounded by the wall portion, wherein the wall portion and the transmissive body are spaced from each other.

In the disclosure, the wall portion covering the light-shielding body with the edge overlapping the pixel electrode in the plan view is spaced from the transmissive body provided inside the recessed portion surrounded by the wall portion. Thus, even in a case where light travels to advance obliquely toward the wall portion, a wall surface of the transmissive body reflects the light toward the transmissive body with high reflection efficiency, and contributes to display. Thus, the light utilization efficiency can be improved.

In the disclosure, an aspect can be adopted in which the electro-optical device includes a second substrate configured to face the first substrate and a liquid crystal layer provided between the first substrate and the second substrate.

The electro-optical device to which the disclosure is applied is used for a variety of electronic apparatuses. According to an aspect of the disclosure, in a case where the electronic apparatus is a projection-type display apparatus, the projection-type display apparatus is provided with a light-source unit configured to emit light to be applied to the electro-optical device, and a projection optical system configured to project light modulated by the electro-optical device.

Yet another aspect of the disclosure is a manufacturing method for an electro-optical device including a first substrate, a pixel electrode provided on one surface side of the first substrate, and a light-shielding body configured to extend between the first substrate and the pixel electrode and to include an edge overlapping the pixel electrode in the plan view as seen in a thickness direction perpendicular to the first substrate, the manufacturing method including forming a wall portion having an insulation property and configured to cover the light-shielding body between the first substrate and the pixel electrode and to extend along an edge of the pixel electrode in the plan view, forming a sacrificial film configured to cover a side surface and a surface on the pixel electrode side of the wall portion, forming a wall surface forming film having a transmissive property and configured to cover the sacrificial film, forming an opening in a part of the wall surface forming film overlapping the wall portion in the plan view, removing the sacrificial film through the opening to form a cavity between the side surface of the wall portion and the wall surface forming film, and forming a transmissive insulating film inside a recessed portion surrounded by the wall portion, the insulating film and the wall surface forming film forming a transmissive body with which the recessed portion is filled.

In the disclosure, the sacrificial film is formed to cover the wall portion, and the wall surface forming film is then formed to cover the sacrificial film. The sacrificial film is removed through the opening of the wall surface forming film by etching to form a cavity. Thus, a thickness of the cavity can be controlled based on a thickness of the sacrificial film, easily allowing the cavity to be prevented from being excessively thick.

DESCRIPTION OF EXEMPLARY EMBODIMENTS

Figure 1:
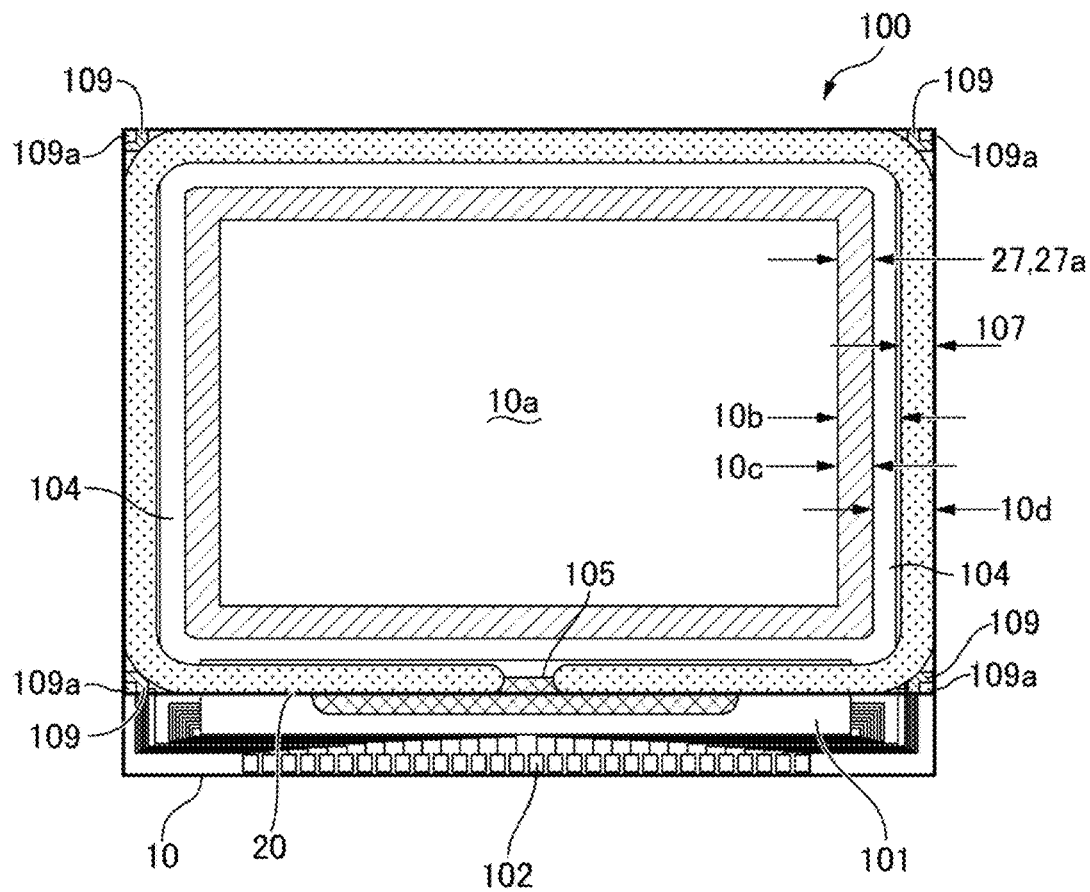
FIG. 1 is a plan view of an electro-optical device to which the disclosure is applied.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Furthermore, in the following description, when description is made of layers formed on a first substrate 10, an upper layer side and a front surface side refers to a side (side on which a second substrate 20 is positioned) opposite to a side on which the first substrate is positioned, and a lower surface side refers to the side on which the first substrate 10 is positioned.

Configuration of Electro-Optical Device

Figure 2:
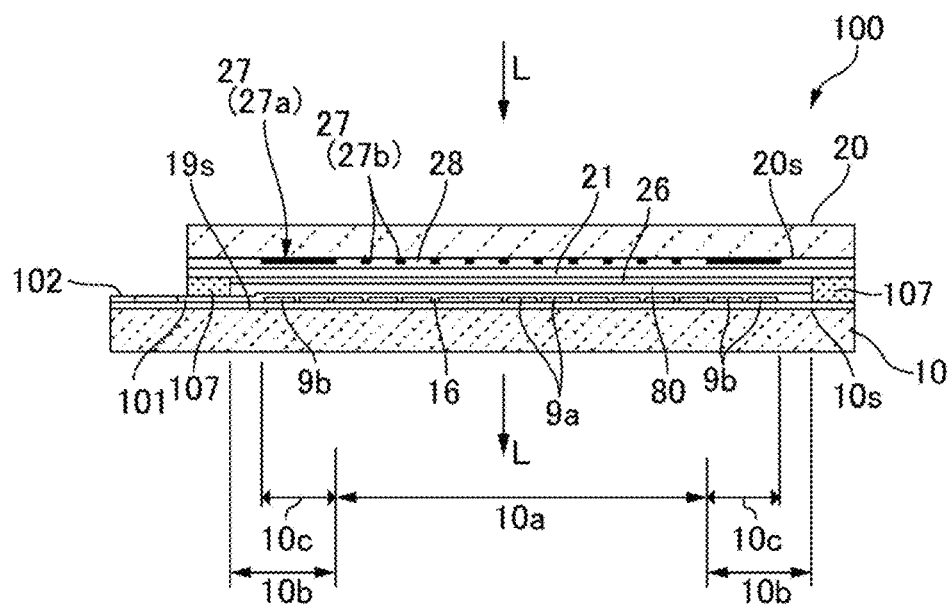
FIG. 2 is a cross-sectional view of the electro-optical device illustrated in FIG. 1.

FIG. 1 is a plan view of an electro-optical device 100 to which the disclosure is applied. FIG. 2 is a cross-sectional view illustrating the electro-optical device 100 illustrated in FIG. 1. As illustrated in FIG. 1 and FIG. 2, in the electro-optical device 100, a first substrate 10 and a second substrate 20 are bonded together with a sealing material 107 through a predetermined gap, where the first substrate 10 is opposed to the second substrate 20. The sealing material 107 is provided in a frame-like shape in conformance with the outer edge of the second substrate 20. An electro-optical layer 80 such as a liquid crystal layer, is provided in a region surrounded by the sealing material 107 between the first substrate 10 and the second substrate 20. Accordingly, the electro-optical device 100 is constituted as a liquid crystal device. The sealing material 107 is a photocurable adhesive, or a photocurable and thermosetting adhesive, and a gap material such as glass fiber or glass beads for setting a distance between the substrates to a predetermined value is compounded in the sealing material 107. The first substrate 10 and the second substrate 20 both have a quadrangle shape, and in a substantially central portion of the electro-optical panel 100, a display region 10a is provided as a quadrangle region. In accordance with such a shape, the sealing material 107 is also provided in a substantially quadrangular shape, and a peripheral region 10b having a rectangular frame shape is provided between an inner peripheral edge of the sealing material 107 and an outer peripheral edge of the display region 10a.

The first substrate 10 is a transmissive substrate such as a quartz substrate or a glass substrate. On one surface 10s side of the first substrate 10 closer to the second substrate 20 and outside of the display region 10a, a data line drive circuit 101 and a plurality of terminals 102 are formed along one of the sides of the first substrate 10, and a scanning line driving circuit 104 is formed along another one of the sides adjacent to the one side. A flexible wiring substrate (not illustrated) is coupled to the terminals 102, and various potentials and various signals are input to the first substrate 10 via the flexible wiring substrate.

In the display region 10a on the one surface 10s side of the first substrate 10, a plurality of transmissive pixel electrodes 9a including an Indium Tin Oxide (ITO) film and switching elements (not illustrated in FIG. 2) each of which is electrically coupled to a corresponding one of the plurality of pixel electrodes 9a are formed in a matrix pattern. A first orientation film 16 is formed on the second substrate 20 side with respect to the pixel electrodes 9a, and the pixel electrodes 9a are covered with the first orientation film 16.

The second substrate 20 is a transmissive substrate such as a quartz substrate or a glass substrate. A transmissive common electrode 21 including an ITO film is formed on one surface 20s side of the second substrate 20 facing the first substrate 10, and a second orientation film 26 is formed on the first substrate 10 side with respect to the common electrode 21. The common electrode 21 is formed over substantially the entire surface of the second substrate 20, and is covered with the second orientation film 26. A light-shielding layer 27 having a light-shielding property and including a resin, metal, or a metal compound is formed between the one surface 20s side of the second substrate 20 and the common electrode 21. A transmissive protective layer 28 is formed between the light-shielding layer 27 and the common electrode 21. The light-shielding layer 27 is formed, for example, as a parting edge 27a in a frame-like shape extending along the outer peripheral edge of the display region 10a. The light-shielding layer 27 is also formed as a light-shielding layer 27b (a black matrix) in a region overlapping in a plan view with a region located between the adjacent pixel electrodes 9a. In the peripheral region 10b of the first substrate 10, a dummy pixel region 9b, which is concurrently formed with the pixel electrodes 9a, is formed in the dummy pixel region 10c that overlaps in the plan view with the parting edge 27a.

Any of the first orientation film 16 and the second orientation film 26 is an inorganic orientation film (vertical orientation film) including an oblique deposition film of $SiO_x$ (x <2), $SiO_2$, $TiO_2$, $MgO$, $Al_2O_3$, and the like, and liquid crystal molecules having negative dielectric anisotropy used for the electro-optical layer 80 are tilt-oriented. Therefore, the liquid crystal molecules form a predetermined angle with respect to the first substrate 10 and the second substrate 20. In this way, the electro-optical device 100 is constituted as a liquid crystal device of a Vertical Alignment (VA) mode.

The first substrate 10 includes inter-substrate conduction electrodes 109 being formed in regions positioning outside the sealing material 107 and overlapping corner portions of the second substrate 20, so that electrical conduction is established between the first substrate 10 and the second substrate 20. Inter-substrate conduction materials 109a including conductive particles are arranged in the inter-substrate conduction electrodes 109. The common electrode 21 of the second substrate 20 is electrically coupled to the first substrate 10 side via the inter-substrate conduction materials 109a and the inter-substrate conduction electrodes 109. Therefore, a common potential is applied to the common electrode 21 from the first substrate 10 side.

In the electro-optical device 100, the pixel electrodes 9a and the common electrode 21 are formed of a transmissive conductive film such as an ITO film, and the electro-optical device 100 is constituted as a transmissive liquid crystal device. In the electro-optical device 100 of the first substrate 10 and the second substrate 20, light that is incident to the electro-optical layer 80 from either one of the substrates is modulated while passing through the other substrate and being emitted, and displays an image. In the exemplary embodiment, the electro-optical device 100 displays an image by the light incident from the second substrate 20 being modulated by the electro-optical layer 80 for each of the pixels while passing through the first substrate 10 and being emitted, as indicated by arrow L.

Specific Configuration of Pixel

Figure 3:
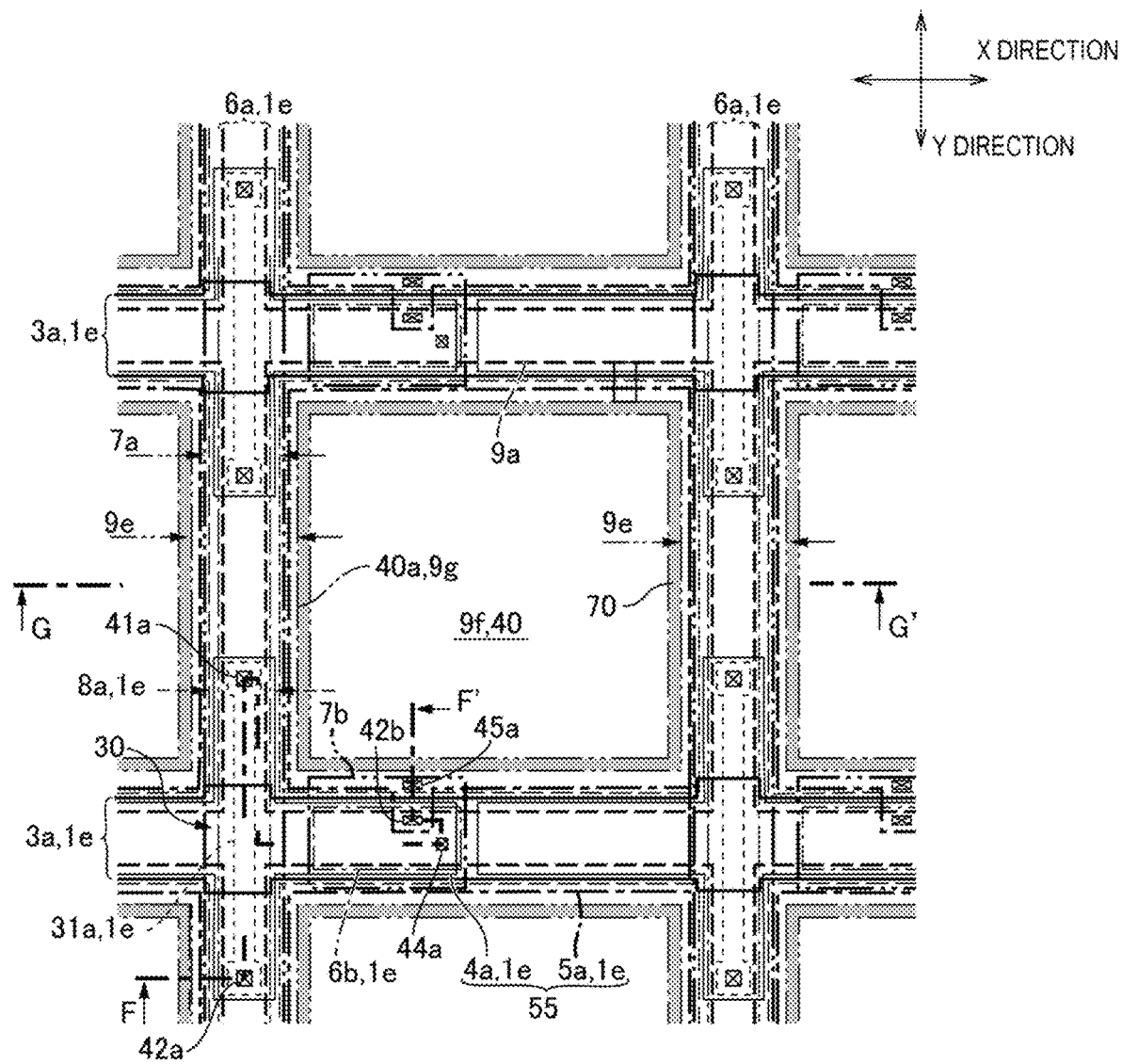
FIG. 3 is a plan view of a plurality of pixels adjacent to each other in the electro-optical device illustrated in FIG. 1.
Figure 4:
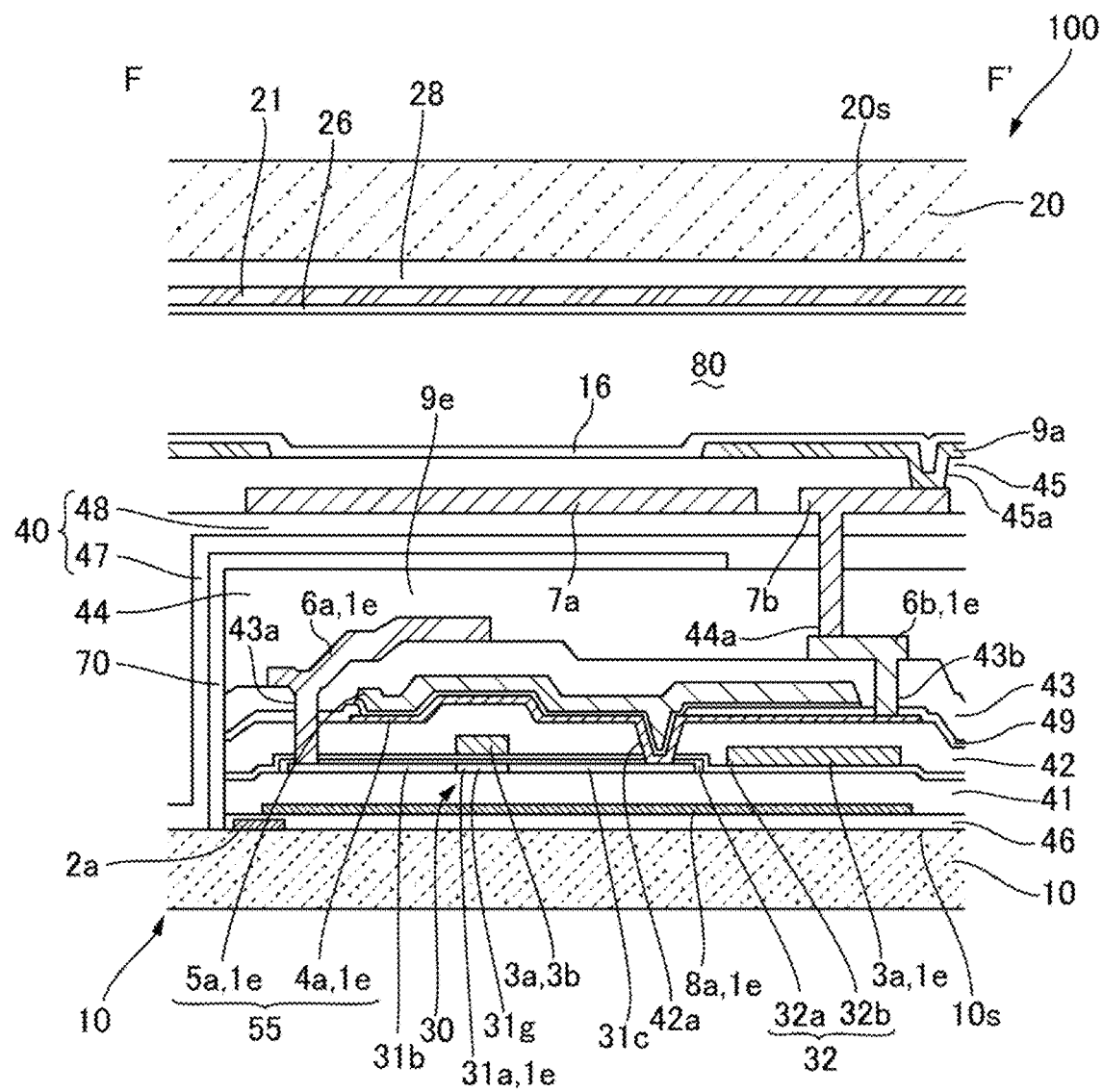
FIG. 4 is an F-F' cross-sectional view of the electro-optical device illustrated in FIG. 3.

FIG. 3 is a plan view of the plurality of pixels adjacent to each other in the electro-optical device 100 illustrated in FIG. 1. FIG. 4 is an F-F' cross-sectional view of the electro-optical device 100 illustrated in FIG. 3. Note that, in FIG. 3, the layers are indicated by lines described below. Moreover, in FIG. 3, for layers including ends overlapping each other in the plan view, positions of the ends are displaced to make shapes and the like of the layers readily recognizable.

A first light shielding layer 8a: a thin and long dashed line
A semiconductor layer 31a: a thin and short dotted line
A scan line 3a: a thick solid line
A drain electrode 4a: a thin solid line
A data line 6a and a relay electrode 6b: a thin long dashed short dashed line
A capacitance line 5a: a thick long dashed short dashed line A second light shielding layer 7a and a relay electrode 7b: a thick long dashed double-short dashed line The pixel electrode 9a: a thick dashed line A cavity 70: a gray region As illustrated in FIG. 3, the plurality of pixel electrodes 9a are formed in the one surface 10s side of the first substrate 10, and the data lines 6a and the scanning lines 3a are formed along inter-pixel regions sandwiched by the pixel electrodes 9a adjacent to each other. The inter-pixel regions extend lengthwise and crosswise. The scan lines 3a linearly extend along first inter-pixel regions of the inter-pixel regions, which extend in an X direction, and the data lines 6a linearly extend along second inter-pixel regions of the inter-pixel regions, which extend in a Y direction. Furthermore, switching elements 30 for pixel switching are formed to correspond to intersections between the data lines 6a and the scan lines 3a, and the switching elements 30 are formed by using intersection regions between the data lines 6a and the scan lines 3a and the vicinities of the intersection regions. The capacitance lines 5a are formed on the first substrate 10, and a common potential Vcom is applied to the capacitance lines 5a. The capacitance lines 5a extend to overlap the scan lines 3a and the data line 6a, and are formed to have a lattice shape. On an upper layer side of the switching element 30, the second light shielding layer 7a is formed, and the second light shielding layer 7a extends to overlap with the data lines 6a and the scanning lines 3a. On a lower layer side of the switching element 30, the first light shielding layer 8a is formed, and the first light shielding layer 8a extends to overlap with the scanning lines 3a and the data lines 6a.

As illustrated in FIG. 4, the one surface 10s side of the first substrate 10 is provided with the first light shielding layer 8a including a conductive film such as a conductive polysilicon film, a metal silicide film, a metal film, or a metal compound film. The first light shielding layer 8a includes, for example, a light shielding film of tungsten silicide (WSi), tungsten, or titanium nitride, and prevents the light from entering the semiconductor layer 31a and causing an erroneous operation in the switching element 30 due to photoelectric current. The first light shielding layer 8a may be configured as a scanning line. In this case, the following configuration to be described later is obtained. That is, the gate electrode 3b and the first light shielding layer 8a are brought into conduction with each other.

On the first substrate 10, on an upper layer side of the first light shielding layer 8a, a transmissive inter-layer insulating film 41 including, for example, a silicon oxide film is formed. On an upper layer side of the inter-layer insulating film 41, the switching element 30 including the semiconductor layer 31a is formed. The switching element 30 is a Thin Film Transistor (TFT), which includes the semiconductor layer 31a and the gate electrode 3b. The semiconductor layer 31a has long sides oriented in an extending direction of the data line 6a. The gate electrode 3b extends in a direction orthogonal to the longitudinal direction of the semiconductor layer 31a, and overlaps a central part of the semiconductor layer 31a in the longitudinal direction. In the exemplary embodiment, the gate electrode 3b includes a part of the scanning line 3a. The switching element 30 includes a transmissive gate insulating layer 32 between the semiconductor layer 31a and the gate electrode 3b. The semiconductor layer 31a includes a channel region 31g facing the gate electrode 3b via the gate insulating layer 32, and also includes a source region 31b and a drain region 31c on one side and the other side of the channel region 31g, respectively. The switching element 30 has an LDD structure.

Thus, on both the sides of the channel region 31g, each of the source region 31b and the drain region 31c includes a low-concentration region. In a region adjacent to a side opposite to the channel region 31g with respect to the low-concentration region, each of the source region 31b and the drain region 31c includes a high-concentration region.

The semiconductor layer 31a is configured of, for example, a polysilicon film (polycrystalline silicon film). The gate insulating layer 32 has a two-layer structure including a first gate insulating layer 32a including a silicon oxide film that is obtained by thermally oxidizing the semiconductor layer 31a, and a second gate insulating layer 32b including a silicon oxide film that is formed by using, for example, the low pressure CVD method. The gate electrode 3b and the scan line 3a include a conductive film such as a conductive polysilicon film, a metal silicide film, a metal film, or a metal compound film.

On an upper layer side of the gate electrode 3b, a transmissive inter-layer insulating film 42 including, for example, a silicon oxide film is formed. On an upper layer of the inter-layer insulating film 42, a drain electrode 4a is formed. The drain electrode 4a includes a conductive film such as a conductive polysilicon film, a metal silicide film, a metal film, or a metal compound film. The drain electrode 4a is formed to have a part overlapping the drain region 31c of the semiconductor layer 31a, and is brought into conduction with the drain region 31c via a contact hole 42a passing through the inter-layer insulating film 42 and the gate insulating layer 32.

On the upper layer side of the drain electrode 4a, a transmissive etching stopper layer 49 including, for example, a silicon oxide film, and a transmissive dielectric layer 55a are formed. On the upper layer side of the dielectric layer 55a, the capacitance line 5a is formed. As the dielectric layer 55a, a silicon compound such as a silicon oxide film or a silicon nitride film can be used. In addition, a dielectric layer having a high dielectric constant such as an aluminum oxide film, a titanium oxide film, a tantalum oxide film, a niobium oxide film, a hafnium oxide film, a lantern oxide film, and a zirconium oxide film can be used. The capacitance line 5a includes a conductive film such as a conductive polysilicon film, a metal silicide film, a metal film, or a metal compound film. The capacitance line 5a overlaps the drain electrode 4a via the dielectric layer 55a, and constitutes a holding capacitor 55.

On an upper layer side of the capacitance line 5a, a transmissive inter-layer insulating film 43 including, for example, a silicon oxide film is formed. On an upper layer side of the inter-layer insulating film 43, the data line 6a and the relay electrode 6b are formed of the same conductive film. The data line 6a and the relay electrode 6b each include a conductive film such as a conductive polysilicon film, a metal silicide film, a metal film, or a metal compound film. The data line 6a is brought into conduction with the source region 31b via a contact hole 43a passing through the inter-layer insulating film 43, the etching stopper layer 49, the inter-layer insulating film 42, and the gate insulating layer 32. The relay electrode 6b is brought into conduction with the drain electrode 4a via a contact hole 43b passing through the inter-layer insulating film 43 and the etching stopper layer 49.

On an upper layer side of the data line 6a and the relay electrode 6b, a transmissive inter-layer insulating film 44 including, for example, a silicon oxide film is formed. On an upper layer side of the inter-layer insulating film 44, the second light shielding layer 7a and the relay electrode 7b are formed of the same conductive film. The second light shielding layer 7a and the relay electrode 7b include a conductive film such as a conductive polysilicon film, a metal silicide film, a metal film, or a metal compound film. The relay electrode 7b is in conduction with the relay electrode 6b via a contact hole 44a passing through the inter-layer insulating film 44. The second light shielding layer 7a extends to overlap with the data line 6a. Note that, the second light shielding layer 7a may be brought into conduction with the capacitance line 5a and used as a shielding layer.

In the exemplary embodiment, a wall surface forming film 47 and an insulating film 48, described below, are laminated on an upper layer side of the inter-layer insulating film 44. The second light shielding layer 7a and the relay electrode 7b are formed on a front surface of the insulating film 48. The contact hole 44a therefore penetrates the insulating film 48, the wall surface forming film 47, and the inter-layer insulating film 44.

On an upper layer side of the second light shielding layer 7a and the relay electrode 7b, a transmissive inter-layer insulating film 45 including, for example, a silicon oxide film is formed. On an upper layer side of the inter-layer insulating film 45, the pixel electrode 9a including an ITO film is formed. A contact hole 45a reaching the relay electrode 7b is formed in the inter-layer insulating film 45. The pixel electrode 9a is electrically coupled to the relay electrode 7b via the contact hole 45a. As a result, the pixel electrode 9a is electrically coupled to the drain region 31c via the relay electrode 7b, the relay electrode 6b, and the drain electrode 4a. The inter-layer insulating film 45 has a flattened surface. On the front surface side of the pixel electrode 9a, the first orientation film 16, which transmits light and includes a polyimide or an inorganic orientation film, is formed.

Configuration of Waveguide 9f

Figure 5:
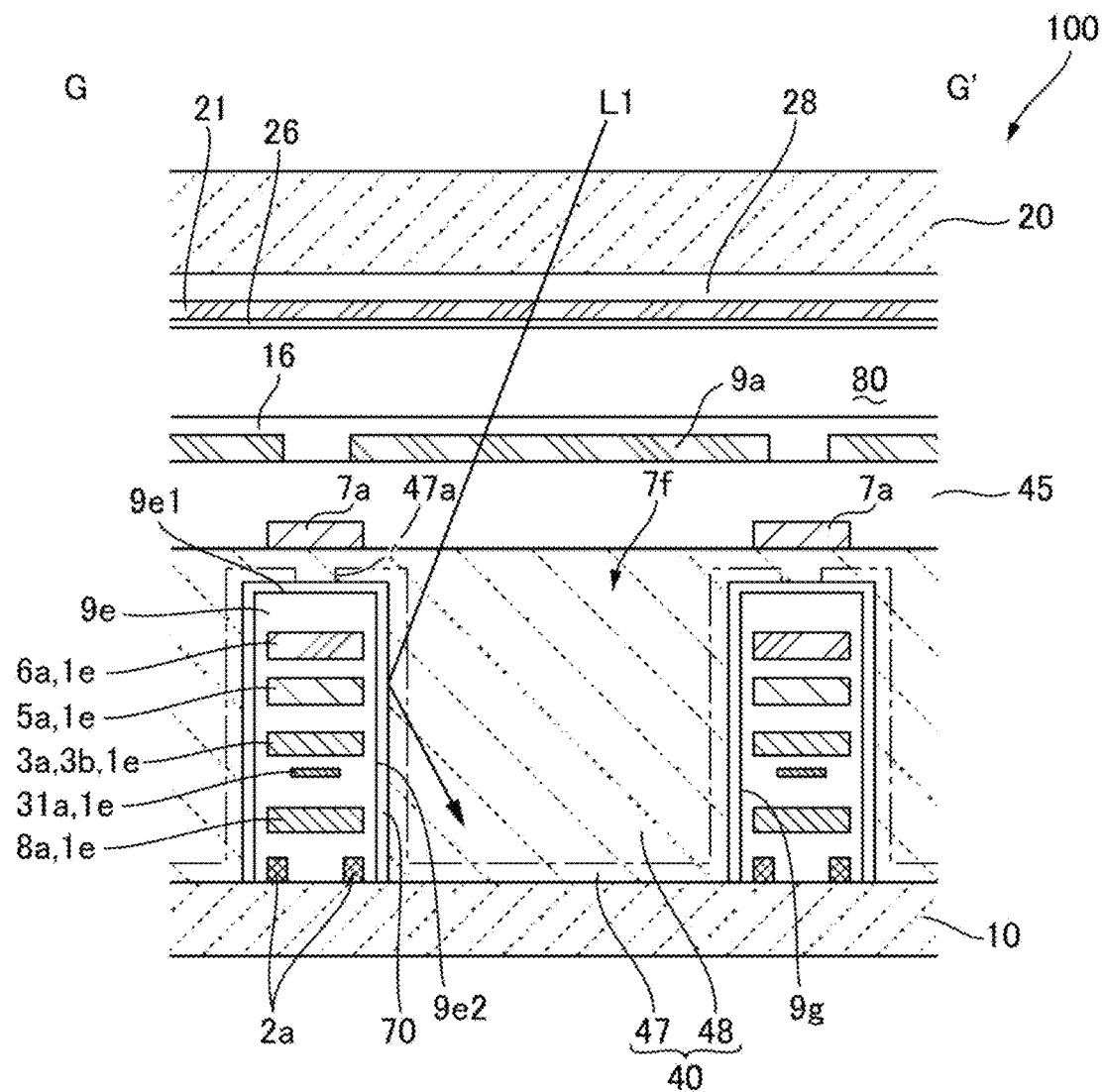
FIG. 5 is a cross-sectional view illustrating the electro-optical device being cut at a position corresponding to arrow G-G' in FIG. 3.
Figure 6:
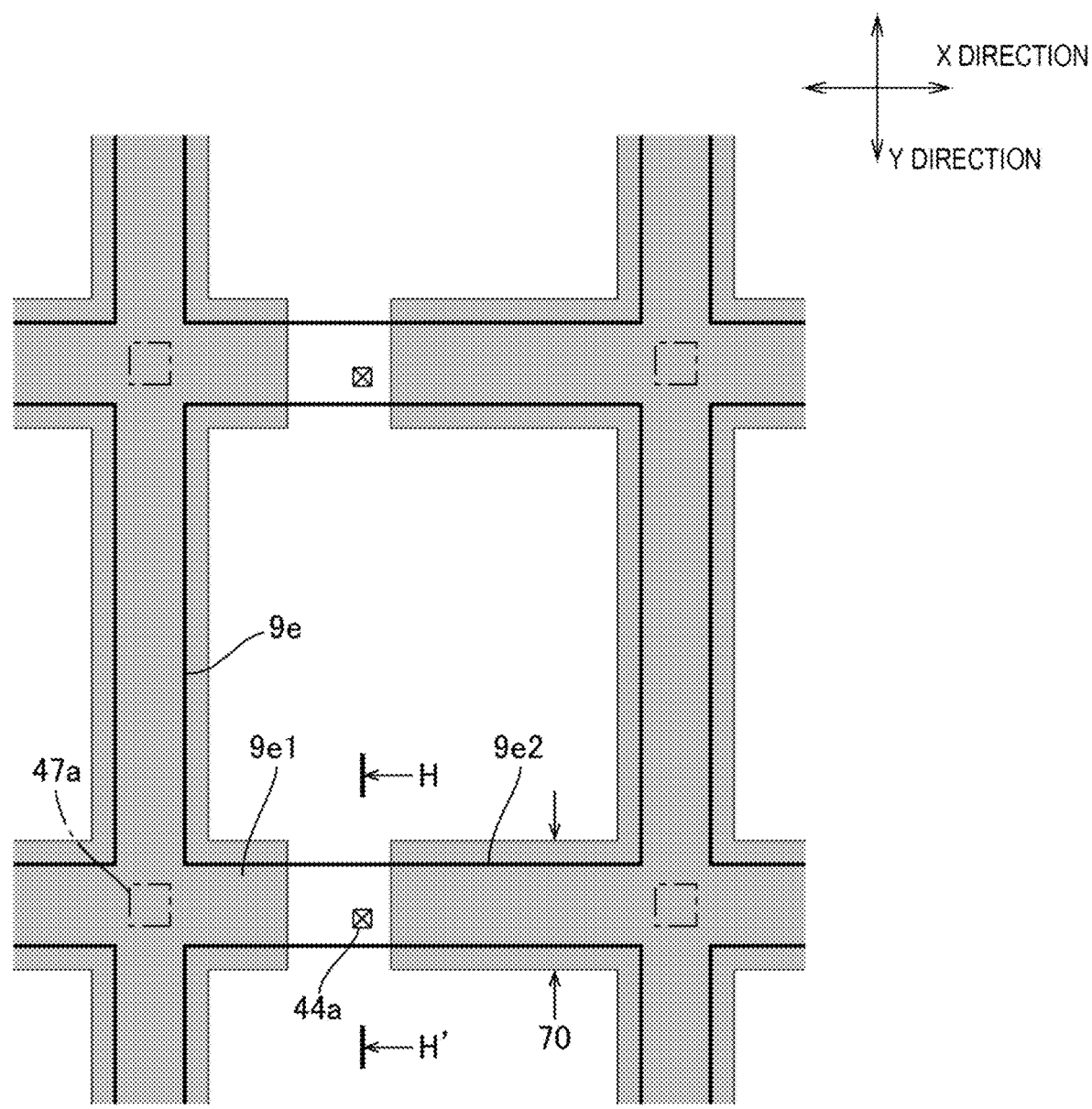
FIG. 6 is a plan view schematically illustrating a formation range of a cavity illustrated in FIG. 3.
Figure 7:
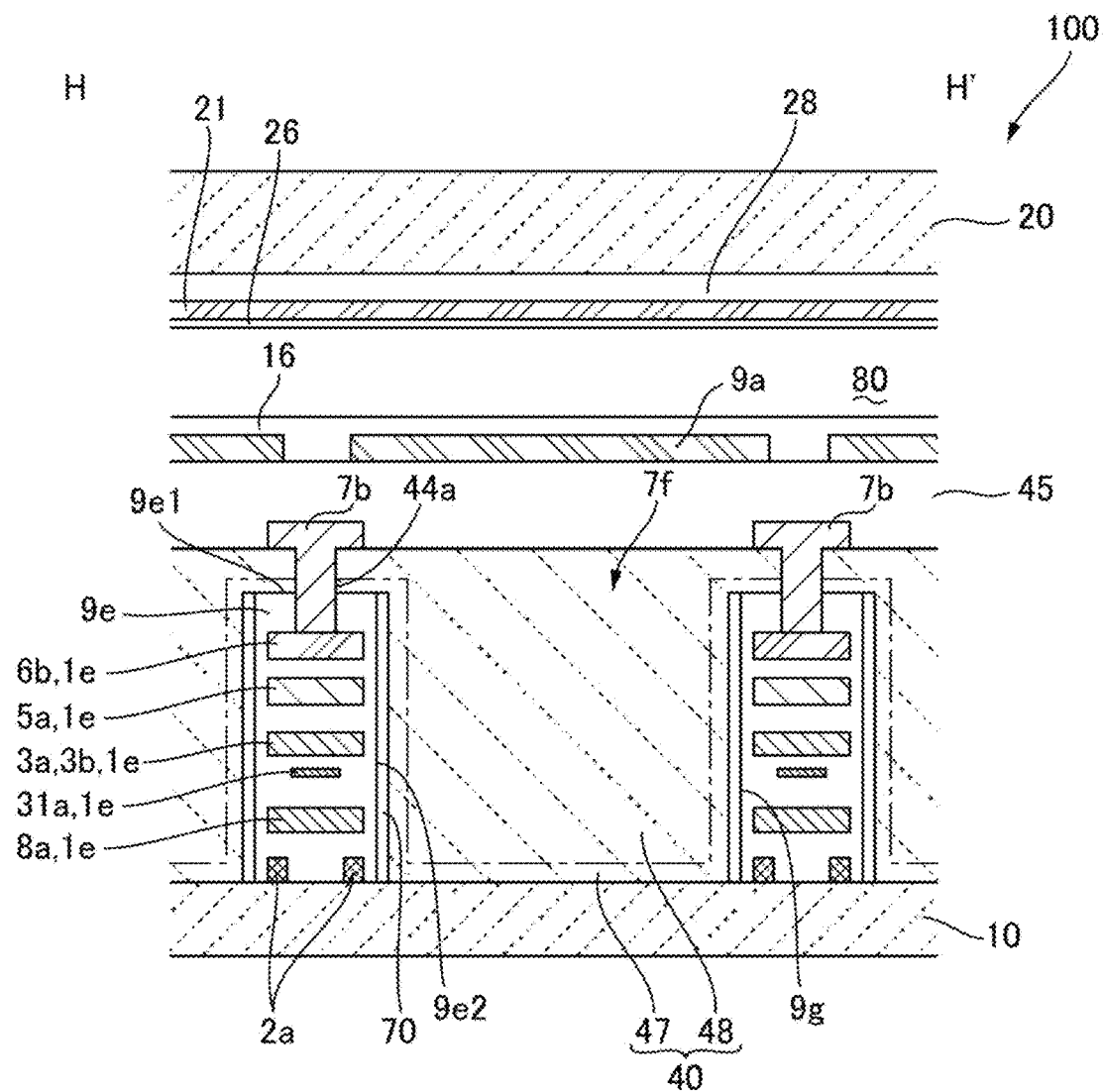
FIG. 7 is an H-H' cross-sectional view illustrating the cavity being cut at a position where a contact hole illustrated in FIG. 6 is located.

FIG. 5 is a cross-sectional view illustrating the electro-optical device 100 being cut at a position corresponding to the arrow G-G' in FIG. 3. FIG. 6 is a plan view schematically illustrating a formation range of the cavity 70 illustrated in FIG. 3, and a formation range of 70 is illustrated as a gray region. FIG. 7 is an H-H' cross-sectional view illustrating the cavity 70 being cut at a position where the contact hole 44a illustrated in FIG. 6 is located. Note that, in FIG. 5 and FIG. 7, as the light-shielding body 1e, only the first light shielding layer 8a, the semiconductor layer 31a, the gate electrode 3b (scan line 3a), the capacitance line 5a, and the data line 6a are illustrated, and that the drain electrode 4a and the relay electrode 6b are omitted from FIG. 5 and FIG. 7.

As illustrated in FIG. 3, FIG. 4, and FIG. 5, in the electro-optical device 100 in the exemplary embodiment, the first light shielding layer 8a, the semiconductor layer 31a, the scan line 3a, the drain electrode 4a, the capacitance line 5a, the data line 6a, and the relay electrode 6b extend between the first substrate 10 and the pixel electrodes 9a along the edge of the pixel electrodes 9a in the plan view. Such wirings and the like each form the light-shielding body 1e.

Furthermore, between the first substrate 10 and the pixel electrode 9a, a transmissive wall portion 9e is formed that covers the light-shielding body 1e and extends in an X direction and a Y direction such that an edge of the wall portion 9e overlaps the pixel electrode 9a in the plan view. Therefore, a portion surrounded by the wall portion 9e corresponds to a recessed portion 9g overlapping the pixel electrode 9a. The first light shielding layer 8a, the semiconductor layer 31a, the scan line 3a, the drain electrode 4a, the capacitance line 5a, the data line 6a, and the relay electrode 6b are each formed between the inter-layer insulating films 41, 42, 43, and 44 and the gate insulating layer 32. The wall portion 9e includes portions of the inter-layer insulating films 41, 42, 43, and 44 and the gate insulating layer 32 that are patterned into a frame shape along the edge of the pixel electrode 9a in the plan view. In the exemplary embodiment, the recessed portion 9g reaches the first substrate 10, and has a bottom portion including the first substrate 10.

An insulating transmissive body 40 is provided in the inner portion of the recessed portion 9g, and the recessed portion 9g forms an opening region, where the light can pass through, in a region overlapping the pixel electrode 9a in the plan view. In the exemplary embodiment, the transmissive body 40 is formed to cover a surface 9e1 (the surface closer to the pixel electrode 9a) of the wall portion 9e opposite to the first substrate 10. A surface of the transmissive body 40 opposite to the first substrate 10 forms a continuous flat surface. The second light shielding layer 7a, the relay electrode 7b, the inter-layer insulating film 45, the pixel electrodes 9a, and the first orientation film 16, illustrated in FIG. 4, are sequentially formed on the flat surface opposite to the first substrate 10.

Here, the transmissive body 40 has a laminate structure including the wall surface forming film 47, which has a light transmissive property, and the insulating film 48, which has a light transmissive property. More specifically, the transmissive body 40 includes the wall surface forming film 47, formed to cover a bottom portion of the recessed portion 9g and the wall portion 9e, and the insulating film 48, with which a recessed portion resulting from formation of the wall surface forming film 47 is filled. A pixel electrode 9a-side surface of the insulating film 48 forms a continuous plane.

The inter-layer insulating films 41, 42, 43, and 44, constituting the wall portion 9e, and the gate insulating film 32 are constituted of a silicon oxide film or the like. The wall surface forming film 47 and the insulating film 48 are constituted of a material identical to a material for the wall portion 9e. Therefore, the wall surface forming film 47, the insulating film 48, the inter-layer insulating film 45, and the like have a refractive index equal to a refractive index of the wall portion 9e.

The wall portion 9e has a width greater than a width of the light-shielding body 1e (the first light shielding layer 8a, the semiconductor layer 31a, the scan line 3a, the drain electrode 4a, the capacitance line 5a, the data line 6a, and the relay electrode 6b). Therefore, the light-shielding body 1e has both the sides covered with the wall portions 9e in the width direction. Therefore, the light-shielding body 1e is not projected from a side surface 9e2 of the wall portion 9e.

In the electro-optical device 100 configured as described above, the cavity 70, extending to cover the side surface 9e2 of the wall portion 9e over a substantially constant thickness, is formed between the side surface 9e2 and the transmissive body 40. A boundary surface between the cavity 70 and the transmissive body 40 forms a reflection surface. A waveguide 9f is configured in a part of the recessed portion 9g surrounded by the wall portion 9e, the part being surrounded by the cavity 70. In the exemplary embodiment, the cavity 70 is formed to cover the entire side surface 9e2 of the wall portion 9e in a thickness direction of the first substrate 10 and in an extending direction of the wall portion 9e. More specifically, the cavity 70 is formed between the wall portion 9e and the wall surface forming film 47 of the transmissive body 40 to cover the side surface 9e2 and a surface 9e1 on the pixel electrode 9a side of the wall portion 9e. However, the cavity 70 is not formed at the bottom portion of the recessed portion 9g. In the exemplary embodiment, the inner portion of the cavity 70 is a vacuum.

The exemplary embodiment adopts a manufacturing method described below with reference to FIG. 8 and FIG. 9 to form the cavity 70. Openings 47a are thus formed in a part of the wall surface forming film 47 overlapping the wall portion 9e in the plan view. For example, the openings 47a are formed at a plurality of positions overlapping the wall portion 9e in the plan view. However, the openings 47a are occluded by the insulating film 48 when the insulating film 48 is formed.

In the inner side of the wall portion 9e, stopper layers 2a are provided between the first substrate 10 and the light-shielding body 1e to face the side surface 9e2 of the wall portion 9e. In the exemplary embodiment, the stopper layers 2a are provided between the first substrate 10 and the first light-shielding body 8a. A transmissive inter-layer insulating film 46 including a silicon oxide film or the like is provided between each of the stopper layers 2a and the first light shielding layer 8a. Here, the wall portion 9e includes the inter-layer insulating film 46, and the recessed portion 9g and the cavity 70 are formed to extend to a position identical to the position of the stopper layer 2a in the thickness direction of the first substrate 10.

As illustrated in FIG. 6, the cavity 70 overlaps the side surface 9e2 of the wall portion 9e and also overlaps a part of the surface 9e1 on the pixel electrode 9a side of the wall portion 9e. However, as illustrated in FIG. 6 and FIG. 7, a part of the surface 9e1 on the pixel electrode 9a side of the wall portion 9e which overlaps, in the plan view, a part of the wall portion 9e where the cavity 70 is not formed is provided with the contact hole 44a electrically coupling a wiring or an electrode positioned closer to the first substrate 10 than the surface 9e1 to a wiring or an electrode positioned closer to the pixel electrode 9a than the surface 9e1. In the exemplary embodiment, the part of the surface 9e1 on the pixel electrode 9a side of the wall portion 9e which overlaps, in the plan view, the part of the wall portion 9e where the cavity 70 is not formed is provided with the contact hole 44a electrically coupling the relay electrode 6b positioned closer to the first substrate 10 than the surface 9e1 to the relay electrode 7b positioned closer to the pixel electrode 9a than the surface 9e1. Therefore, even in a case where the cavity 70 overlaps a part of the surface 9e1 on the pixel electrode 9a side of the wall portion 9e, electric coupling via the contact hole 44a can be reliably achieved.

Manufacturing Method for Electro-Optical Device 100

Figure 8:
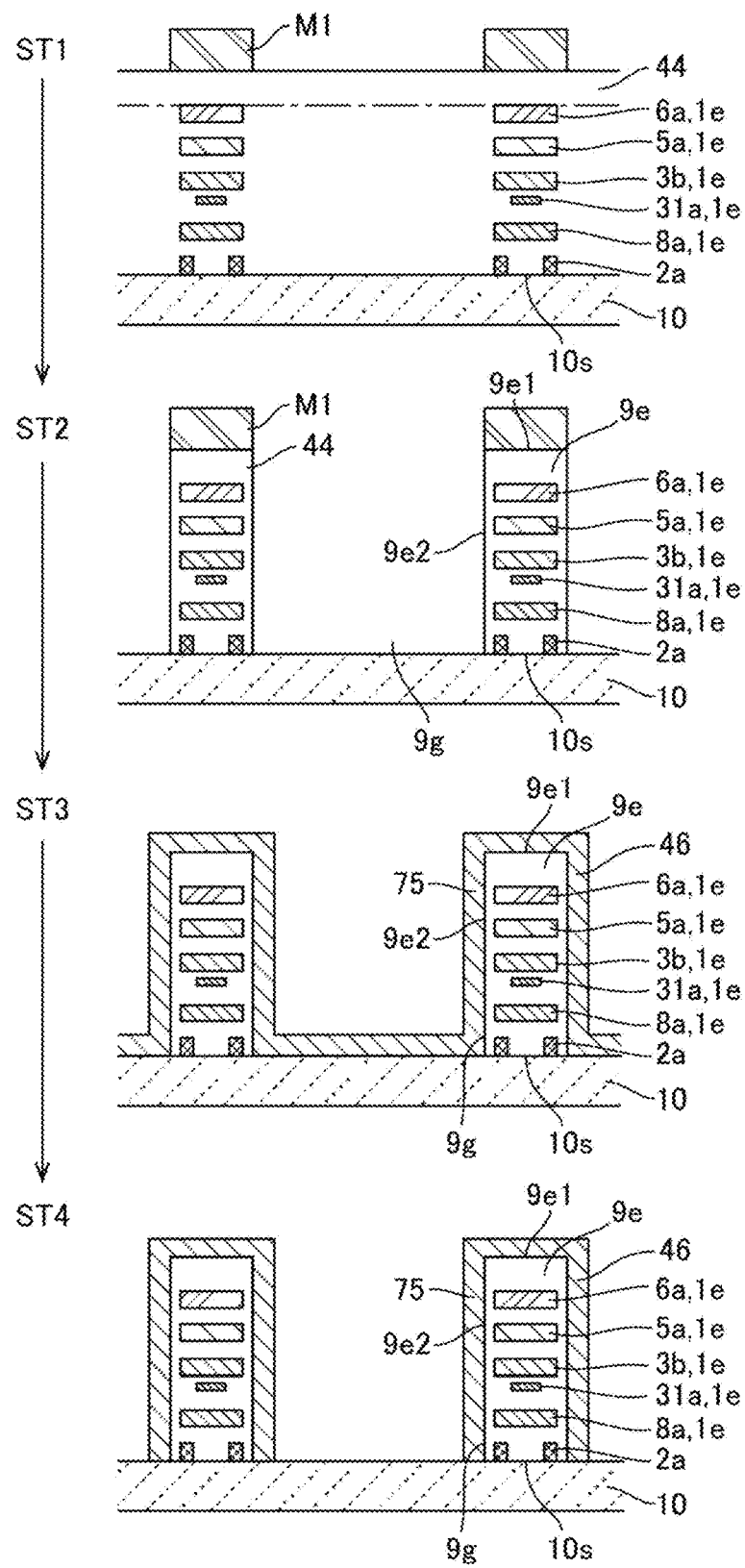
FIG. 8 is a cross-sectional view illustrating steps of a manufacturing method for the electro-optical device illustrated in FIG. 1.

FIG. 8 is a cross-sectional view illustrating steps of a manufacturing method for the electro-optical device 100 illustrated in FIG. 1, and the steps in FIG. 8 resulting in patterning of a sacrificial film 75. FIG. 9 is a cross-sectional view illustrating steps of the manufacturing method following the steps illustrated in FIG. 8, and the steps in FIG. 9 resulting in planarization of the insulating film 48. Note that FIG. 8 and FIG. 9 correspond to a cross-sectional view taken along line G-G' in FIG. 5. However, for an easy understanding of features of the manufacturing method, the sacrificial film 75 and the like, used to form the cavity 70, are illustrated thicker than in FIG. 5.

The steps of forming the cavity 70 in the manufacturing process for the electro-optical device 100 in the exemplary embodiment are as described below. First, in step ST1 illustrated in FIG. 8, the stopper layer 2a, the first light shielding layer 8a, the semiconductor layer 31a, the scan line 3a, the capacitance line 5a, the data line 6a, the inter-layer insulating film 44, and the like are sequentially formed on the one surface 10s side of the first substrate 10.

Furthermore, in the semiconductor layer 31a, impurities are doped into the source region 31b and the drain region 31c as illustrated in FIG. 4.

Then, in step ST2 illustrated in FIG. 8 (first step), with an etching mask M1 formed on a front surface of the inter-layer insulating film 44, the inter-layer insulating films 41, 42, 43, and 44 and the gate insulating layer 32 are patterned, and the wall portion 9e is formed to cover the light-shielding body 1e. As a result, a part surrounded by the wall portion 9e forms the recessed portion 9g, and the recessed portion 9g reaches a position identical to the position of the stopper layer 2a in the thickness direction of the first substrate 10. The etching mask M1 is then subsequently removed. In the exemplary embodiment, when the wall portion 9e is formed by etching, an etching end point can be managed based on a positional relationship between the stopper layer 2a and the side surface 9e2 of the wall portion 9e. Accordingly, the width of the wall portion 9e becomes excessively narrow, and the light-shielding body 1e to project from the side surface 9e2 of the wall portion 9e can be suppressed.

Then, in step ST3 illustrated in FIG. 8 (second step), the sacrificial film 75 such as a silicon film is formed on the one surface 10s side of the first substrate 10 to cover the side surface 9e2 and the surface 9e1 on the pixel electrode 9a side of the wall portion 9e. In the exemplary embodiment, the sacrificial film 75 is formed to cover the side surface 9e2 and the surface 9e1 on the pixel electrode 9a side of the wall portion 9e over a prescribed film thickness.

Then, in step ST4 illustrated in FIG. 8, with an etching mask formed (not illustrated), the sacrificial film 75 is patterned to remove a part of the sacrificial film 75 overlapping the wall portion 9e in the plan view, while removing a part of the sacrificial film 75 overlapping the bottom portion of the recessed portion 9g. In the exemplary embodiment, the sacrificial film 75 is patterned utilizing reactive ion etching. Thus, even in a case where a part of the sacrificial film 75 covering the side surface 9e2 of the wall portion 9e is exposed from the etching mask, the sacrificial film 75 remains on the side surface 9e2 of the wall portion 9e.

Figure 9:
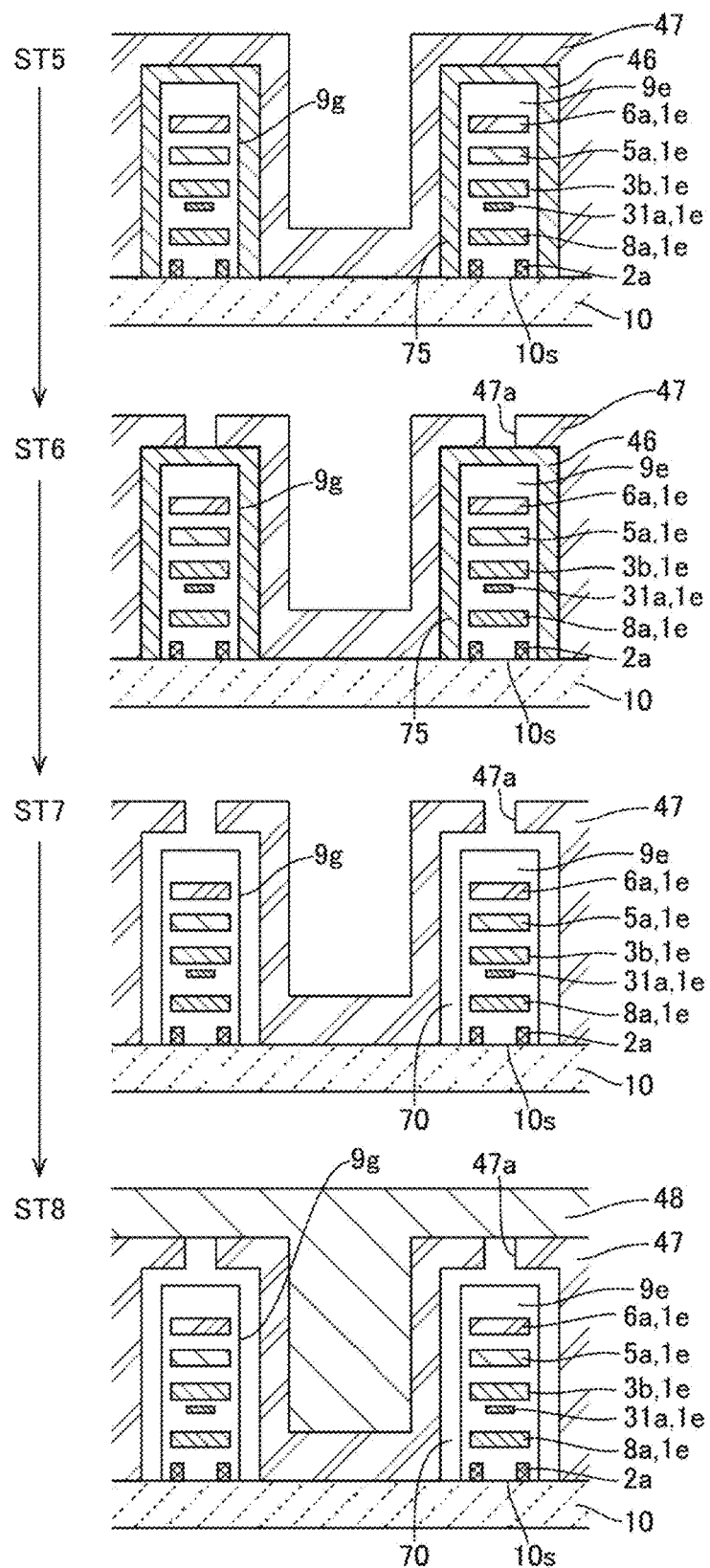
FIG. 9 is a cross-sectional view illustrating steps following the steps illustrated in FIG. 8.

Then, in step ST5 illustrated in FIG. 9, the wall surface forming film 47, including a silicon oxide film or the like, is formed to cover the sacrificial film 75 (third step).

Then, in step ST6 illustrated in FIG. 9 (fourth step), with an etching mask formed (not illustrated), etching is performed to form the openings 47a in the part of the sacrificial film 75 overlapping the wall portion 9e in the plan view.

Then, in step ST7 illustrated in FIG. 9 (fifth step), the sacrificial film 75 is removed through the openings 47a by etching to form the cavity 70 between the wall portion 9e and the wall surface forming film 47. The sacrificial film 75 is removed in a vacuum atmosphere by dry etching with high etching selectivity between a silicon oxide film and a silicon film.

Then, in step ST8 illustrated in FIG. 9 (sixth step), the insulating film 48 is formed on a front surface of the wall surface forming film 47. The inner portion of the recessed portion 9g is filled with the transmissive body 40 including the wall surface forming film 47 and the insulating film 48 laminated onto each other. The front surface of the insulating film 48 is then planarized by etchback or CMP.

Subsequently, as illustrated in FIG. 4, the second light shielding layer 7a, the inter-layer insulating film 45, the pixel electrode 9a, and the like are formed on the front surface of the insulating film 48. Well-known steps are then performed, for example, the first substrate 10 and the second substrate 20 are placed to face each other via the electro-optical layer 80. The electro-optical device 100 is thus completed.

Note that, in the exemplary embodiment, the sacrificial film 75 is configured to directly covers the wall portion 9e but that, after the wall portion 9e is formed, a protect film covering the wall portion 9e may be formed and the sacrificial film 75 may then be formed. In this case, the cavity 70 is formed between the protect film and the wall surface forming film 47.

Main Effects of Exemplary Embodiment

As described above, in the electro-optical device 100 according to the exemplary embodiment, the cavity 70 is formed between the wall portion 9e covering the light-shielding body 1e with the edge overlapping the pixel electrode 9a in the plan view and the transmissive body 40 provided inside the recessed portion 9g surrounded by the wall portion 9e. There is a significant difference in refractive index at the boundary surface between the transmissive body 40 and the cavity 70. That is, the silicon oxide film constituting the transmissive body 40 has a refractive index of 1.46 and the cavity 70 has a refractive index of 1, with respect to visible light with a wavelength of 550 nm. The difference in refractive index is thus 0.46. Thus, even in a case where light travels to advance obliquely toward the wall portion 9e as illustrated by arrow L1, the boundary surface between the transmissive body 40 and the cavity 70 reflects the light toward the transmissive body 40 with high reflection efficiency, and contributes to display. In the exemplary embodiment, light source light from the second substrate 20 side is modulated by the electro-optical layer 80 (liquid crystal layer) and then enters the first substrate 10. At this time, even in a case where the modulated light travels to advance obliquely toward the wall portion 9e, the boundary surface between the transmissive body 40 and the cavity 70 reflects the light toward the transmissive body 40 with high reflection efficiency. The light is then emitted from the first substrate 10. Thus, the light utilization efficiency can be improved.

In other words, the wall portion 9e and the transmissive body 40 are spaced from each other. Thus, even in a case where light traveling through the transmissive body 40 advances obliquely toward the wall portion 9e, a wall surface of the transmissive body 40 reflects the light toward the transmissive body 40 with high reflection efficiency, and contributes to display. Thus, the light utilization efficiency can be improved.

Furthermore, the cavity 70 is formed to cover the entire side surface 9e2 of the wall portion 9e in the thickness direction and in the extending direction of the wall portion 9e. Thus, light traveling to advance obliquely toward the wall portion 9e is reflected by the boundary surface between the transmissive body 40 and the cavity 70 to travel over a wide range toward the transmissive body 40. Thus, the light utilization efficiency can be improved.

Furthermore, in the exemplary embodiment, the transmissive body 40, the wall portion 9e, the inter-layer insulating film 45, and the like are formed of a silicon oxide film and thus have an equal refractive index. Consequently, even in a case where light obliquely enters the boundary surface between the transmissive body 40 and the inter-layer insulating film 45, reflection is less likely to occur at the boundary surface between the transmissive body 40 and the inter-layer insulating film 45. This advantageously improves the light utilization efficiency.

Furthermore, light traveling from the pixel electrode 9a side toward the semiconductor layer 31a of the switching element 30 can be reflected by the boundary surface between the transmissive body 40 and the cavity 70. Moreover, light emitted from the electro-optical device 100 may be reflected by an optical element or the like and enter the electro-optical device 100 again. In such a case, even when such return light travels to advance from the first substrate 10 side toward the semiconductor layer 31a, the return light can be reflected by the boundary surface between the transmissive body 40 and the cavity 70. This allows further prevention of a possible optical leakage current in the switching element 30.

Furthermore, in the manufacturing method according to the exemplary embodiment, after the sacrificial film 75 is formed to cover the wall portion 9e, the wall surface forming film 47 is formed to cover the sacrificial film 75. The sacrificial film 75 is removed through the opening 47a of the wall surface forming film 47 by etching to form the cavity 70. Thus, a thickness of the cavity 70 can be controlled based on a thickness of the sacrificial film 75, easily allowing the cavity 70 to be prevented from being excessively thick. Moreover, the inner portion of the cavity 70 is a vacuum and may thus be blocked utilizing a semiconductor process in a vacuum. Thus, compared to a case where the inner portion of the cavity 70 is to be an air layer, the cavity 70 forms easily.

Another Exemplary Embodiment

In the exemplary embodiment described above, the transmissive body 40, the wall portion 9e, the inter-layer insulating film 45, and the like are either a silicon oxide film. However, the transmissive body 40 may be formed of a material such as a silicon oxynitride film which has a higher refractive index than the wall portion 9e. In this case, the silicon oxynitride film has a refractive index of 1.64 with respect to visible light with a wavelength of 550 nm. Thus, the difference in refractive index at the boundary surface between the transmissive body 40 and the cavity 70 can be increased up to 1.64. Therefore, even in a case where light travels to advance obliquely toward the wall portion 9e, the boundary surface between the transmissive body 40 and the cavity 70 reflects the light toward the transmissive body 40 with high reflection efficiency, and contributes to display.

Note that, in a case where the transmissive body 40 is formed of a high-refractive-index material such as a silicon oxynitride film, the configuration of the transmissive body 40 may be either such that both the wall surface forming film 47 and the insulating film 48 are formed of the high-refractive-index material or such that one of the wall surface forming film 47 and the insulating film 48 is still formed of a silicon oxide film, whereas the other is formed of the high-refractive-index material such as a silicon oxynitride film.

Other Exemplary Embodiments

In the exemplary embodiment described above, the sacrificial film 75 is patterned in step ST4 illustrated in FIG. 8. Alternatively, in step ST6 illustrated in FIG. 9 (fourth step), the opening 47a, when formed in the wall surface forming film 47, may be further enlarged, and in step ST7 illustrated in FIG. 9 (fifth step), the sacrificial film 75, when removed by etching, may be removed from the position where the contact hole 44a is formed and the bottom portion of the recessed portion 9g.

Installation Example to Electronic Apparatus

Figure 10:
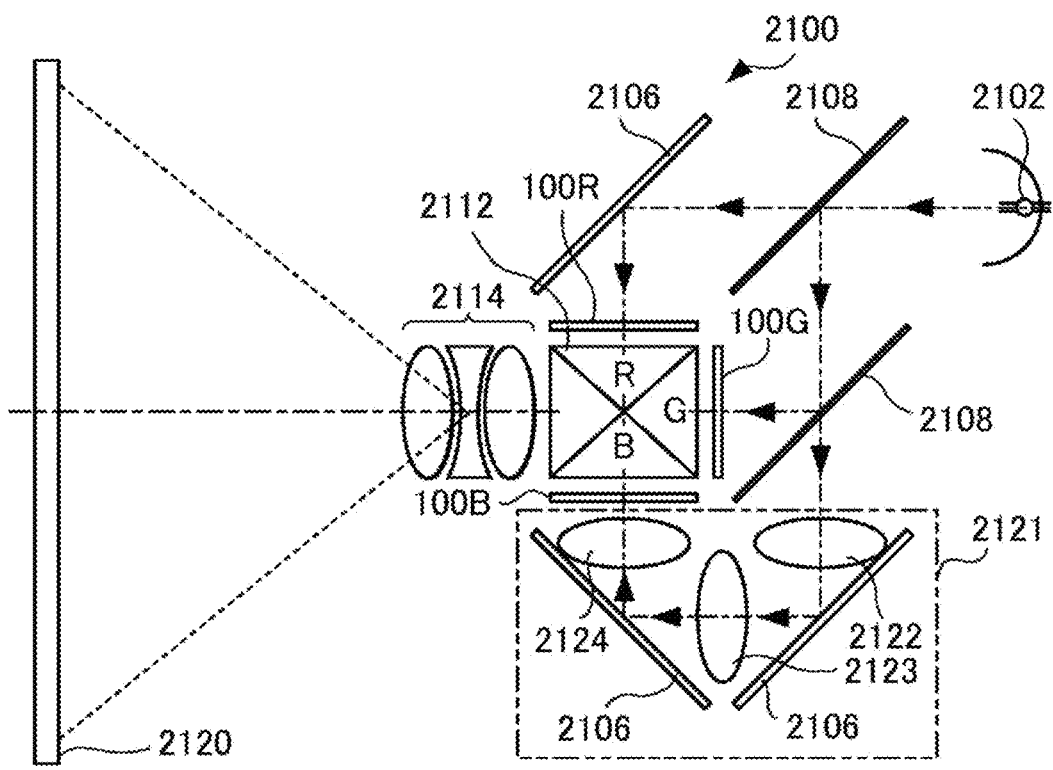
FIG. 10 is a schematic configuration view of a projection-type display device (electronic apparatus) using an electro-optical device to which the disclosure is applied.

An electronic apparatus using the electro-optical device 100 according to the above-described exemplary embodiments will be described below. FIG. 10 is a schematic configuration view of a projection-type display device (electronic apparatus) using the electro-optical device 100 to which the disclosure is applied. An optical element such as a polarizing plate is omitted from FIG. 10. The projection-type display apparatus 2100 illustrated in FIG. 10 is an example of an electronic apparatus using the electro-optical device 100. The projection-type display device 2100, in which the electro-optical device 100 is used as a light valve, can conduct high-definition and bright display without making the apparatus large. As illustrated in this figure, a lamp unit 2102 (light-source unit) including a white light source such as a halogen lamp is provided inside the projection-type display apparatus 2100. Projection light emitted from the lamp unit 2102 is split into three primary colors of R (red), G (green), and B (blue) by three mirrors 2106 and two dichroic mirrors 2108 installed inside. The split incident light is guided to light valves 100R, 100G, and 100B corresponding to each of the primary colors, and then modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, images of the primary colors are synthesized, and subsequently a color image is projected on a screen 2120 by a projection lens group 2114 (projection optical system).

Other Projection-Type Display Apparatuses

Note that the projection-type display apparatus may include a configuration in which an LED light source or the like configured to emit light of each color is used as a light source unit and the light of each color emitted from the LED light source is supplied to another liquid-crystal device.

Other Electronic Apparatuses

The electronic apparatus including the electro-optical device 100 to which the disclosure is applied is not limited to the projection-type display apparatus 2100 of the above-described exemplary embodiment. Examples of the electronic apparatus may include a projection-type Head Up Display (HUD), a direct-view type Head Mounted Display (HMD), a personal computer, a digital still camera, and a liquid crystal television.

What is claimed is:

1. An electro-optical device comprising:
   a first substrate;
   a pixel electrode;
   a light-shielding body including an edge overlapping the pixel electrode in a plan view;
   a wall portion having an insulation property and configured to cover the light-shielding body between the first substrate and the pixel electrode and arranged along an edge of the pixel electrode in the plan view; and
   a transmissive body provided in a region surrounded by the wall portion, wherein
   a cavity provided between the wall portion and the transmissive body.

2. The electro-optical device according to claim 1, wherein the cavity is provided to cover the wall portion.

3. The electro-optical device according to claim 1, wherein the cavity includes a vacuum.

4. The electro-optical device according to claim 1, wherein
   the cavity is configured to overlap a part of a surface on the pixel electrode side of the wall portion, and
   a contact hole, electrically coupling a wiring or an electrode positioned closer to the first substrate than the surface on the pixel electrode side to a wiring or an electrode positioned closer to the pixel electrode than the surface on the pixel electrode side, is provided in a portion which overlaps, in the plan view, a part of the surface on the pixel electrode side of the wall portion where the cavity is not formed.

5. The electro-optical device according to claim 1, wherein
   the transmissive body has a refractive index equal to a refractive index of the wall portion.

6. The electro-optical device according to claim 1, wherein
   the transmissive body has a higher refractive index than the wall portion.

7. The electro-optical device according to claim 1, wherein
   the wall portion includes a plurality of inter-layer insulating films provided between the first substrate and the pixel electrode, and
   the light-shielding body includes a wiring or electrode provided between adjacent ones of the plurality of inter-layer insulating films.

8. The electro-optical device according to claim 1, wherein
   a stopper layer configured to face a side surface of the wall portion between the first substrate and the light-shielding body is provided inside the wall portion, and
   the cavity is formed to extend to a position identical to a position of the stopper layer in a thickness direction perpendicular to the first substrate.

9. The electro-optical device according to claim 1, comprising:
   a second substrate configured to face the first substrate; and
   a liquid crystal layer provided between the first substrate and the second substrate.

10. An electronic apparatus comprising the electro-optical device according to claim 1.

* * * * *